US008943238B2

(12) United States Patent
Birsan et al.

(10) Patent No.: US 8,943,238 B2
(45) Date of Patent: Jan. 27, 2015

(54) OPERATIONS USING DIRECT MEMORY ACCESS

(75) Inventors: Laurentiu Birsan, Saint Herblain (FR); Jacques Tellier, Nantes (FR); Benoit Mouchel, Heric (FR)

(73) Assignee: Atmel Corporation, San Jose, CA (US)

( * ) Notice: Subject to any disclaimer, the term of this patent is extended or adjusted under 35 U.S.C. 154(b) by 307 days.

(21) Appl. No.: 13/475,316

(22) Filed: May 18, 2012

(65) Prior Publication Data
US 2013/0311699 A1 Nov. 21, 2013

(51) Int. Cl.
*G06F 12/02* (2006.01)
*G06F 13/28* (2006.01)

(52) U.S. Cl.
CPC ...................................... *G06F 13/28* (2013.01)
USPC ................................................ 710/22; 710/24

(58) Field of Classification Search
None
See application file for complete search history.

(56) References Cited

U.S. PATENT DOCUMENTS

| | | | | |
|---|---|---|---|---|
| 4,782,439 A | | 11/1988 | Borkar et al. | 710/23 |
| 5,179,663 A | * | 1/1993 | Iimura | 710/35 |
| 5,381,538 A | * | 1/1995 | Amini et al. | 711/156 |
| 5,752,076 A | * | 5/1998 | Munson | 710/5 |
| 5,918,070 A | * | 6/1999 | Moon et al. | 710/22 |
| 5,958,029 A | * | 9/1999 | McKinnon | 710/100 |
| 5,970,069 A | * | 10/1999 | Kumar et al. | 370/402 |
| 5,974,480 A | * | 10/1999 | Qureshi et al. | 710/27 |
| 6,154,793 A | * | 11/2000 | MacKenna et al. | 710/23 |
| 6,324,599 B1 | * | 11/2001 | Zhou et al. | 710/26 |
| 6,738,881 B1 | * | 5/2004 | Ollivier et al. | 711/168 |
| 7,031,211 B1 | | 4/2006 | Telecco et al. | 365/201 |
| 7,620,070 B1 | * | 11/2009 | Maufer et al. | 370/474 |
| 8,117,475 B2 | * | 2/2012 | Pesavento et al. | 713/323 |
| 8,250,250 B2 | * | 8/2012 | Moallem et al. | 710/20 |
| 8,433,829 B2 | * | 4/2013 | Kwon et al. | 710/22 |
| 2008/0147907 A1 | * | 6/2008 | Triece et al. | 710/22 |
| 2008/0148083 A1 | * | 6/2008 | Pesavento et al. | 713/322 |
| 2011/0099301 A1 | * | 4/2011 | Moallem et al. | 710/22 |
| 2011/0138086 A1 | * | 6/2011 | Kwon et al. | 710/26 |
| 2012/0290881 A1 | * | 11/2012 | Moallem et al. | 714/37 |

OTHER PUBLICATIONS

Wikipedia's article on 'nvSRAM' archived from Sep. 6, 2008.*
'Tips and Tricks with DMA on MPC56xx' by Freescale Semiconductor, Document No. AN4147, Application Note, Rev. 0, Jul. 2010.*
Atmel Corporation, 32-bit AVR Microcontrollers, Application Note, "AVR32108: Peripheral Direct Memory Access Driver," Rev. 32016A-AVR32-05/06, pp. 1-8 (2006).
Atmel Corporation, 8-bit AVR XMEGA A Microcontroller XMEGA A Manual, Preliminary, 8077H-AVR-12/09, pp. 1-445 (2009).
Atmel Corporation, 8/16-bit AVR, XMEGA A3 Microcontroller, ATxmega256A3, ATxmega192A3, ATxmega128A3, ATxmega64A3, 8068T-AVR-12/10, pp. 1-134 (2010).

* cited by examiner

*Primary Examiner* — Steven Snyder
(74) *Attorney, Agent, or Firm* — Fish & Richardson P.C.

(57) ABSTRACT

A system includes a serial interface, a peripheral device coupled to the serial interface, non-volatile memory, and a DMA controller including multiple linked channels. The various channels can be configured in different modes to facilitate the DMA controller performing various operations, such as data transfer, with respect to the non-volatile memory or the peripheral device.

21 Claims, 4 Drawing Sheets

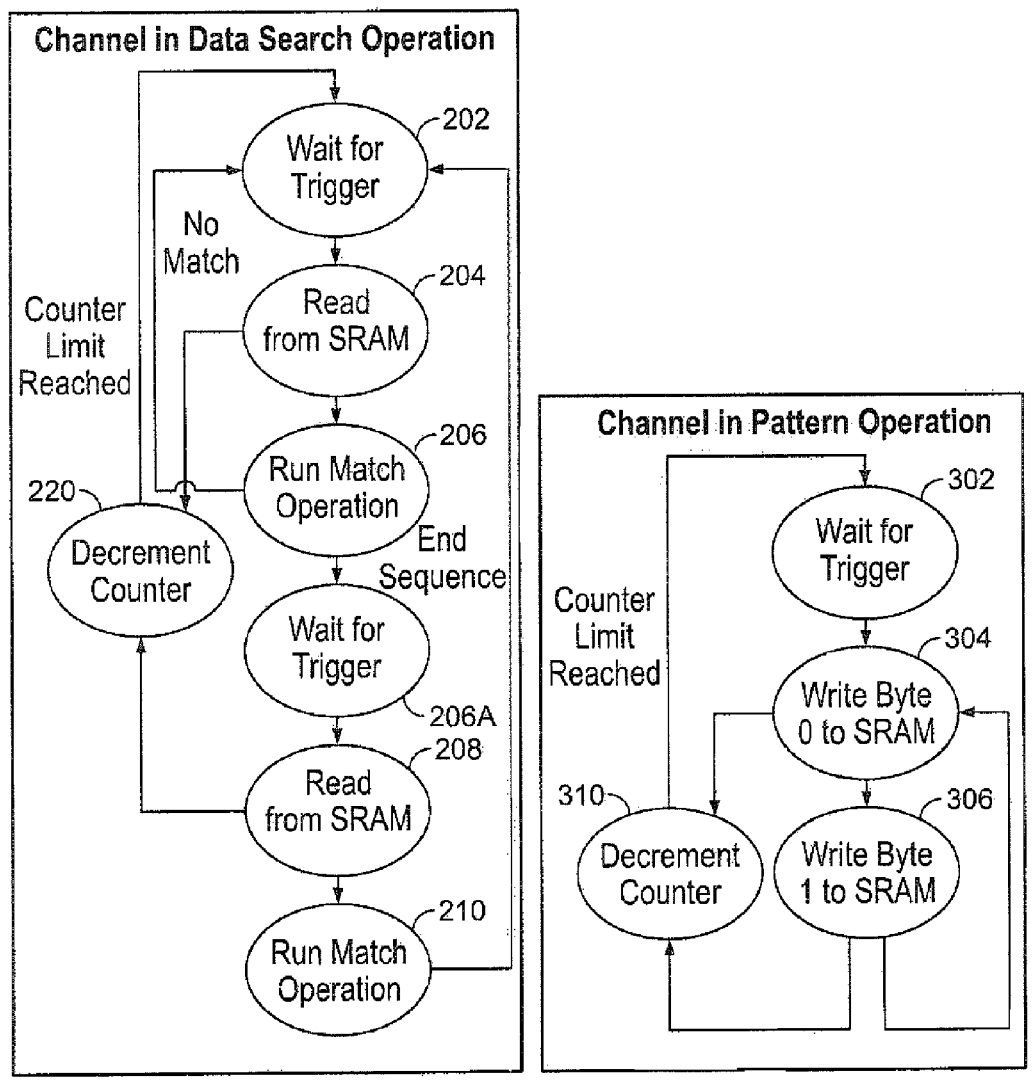
FIG. 4                    FIG. 5

OPERATIONS USING DIRECT MEMORY ACCESS

FIELD OF THE DISCLOSURE

This disclosure relates to operations using direct memory access, such as operations involving peripherals and non-volatile memories.

BACKGROUND

Direct memory access (DMA) is a feature of modern computers that allows certain hardware subsystems within the computer to access system memory independently of the central processing unit (CPU). Without DMA, when the CPU is using programmed input/output, it typically is fully occupied for the entire duration of the read or write operation, and is thus unavailable to perform other tasks. DMA can be useful, for example, when the CPU cannot keep up with the rate of data transfer, or when the CPU needs to perform useful work while waiting for a relatively slow I/O data transfer.

SUMMARY

Various aspects of the disclosure, which relates to direct memory access, are described in the detailed description below and in the accompany drawings.

For example, according to one aspect, a system includes a direct memory access (DMA) controller that includes DMA channels. A first one of the channels is operable to enable a data transfer from a peripheral device to non-volatile memory to occur only if the first channel first determines there is a match between information from the peripheral device and information stored by the DMA controller. The DMA controller is operable to determine whether there is a match between the information from the peripheral device and the information stored by the DMA controller and to transfer the data without intervention by a CPU.

In another aspect, a system includes a DMA controller that includes DMA channels, wherein a first one of the channels is operable to read information from non-volatile memory (e.g., SRAM) and to determine whether there is a match between the information from the non-volatile memory and information stored by the DMA controller.

According to yet another aspect, a DMA controller includes DMA channels, wherein a first one of the channels is operable to write, in response to a trigger signal, predetermined information (e.g., a specified wake-up character) to non-volatile memory or a serial interface.

The foregoing aspects can, in some implementations, be combined in a single system. For example, a system can include a serial interface, a peripheral device coupled to the serial interface, non-volatile memory, and a DMA controller including multiple linked channels. A first channel can be configured to operate in a first pattern mode, a second channel configured to operate in a second mode, and a third channel configured to operate in a third mode. The first channel is operable to write a wake-up character to the serial interface for transmission to the peripheral device. The second channel is operable to determine whether there is a match between information from the peripheral device and information stored by the DMA controller, and if there is such a match, to enable the third channel to transfer data from the peripheral device to the non-volatile memory.

Methods of using the DMA controller are disclosed as well. Using the DMA controller to perform these and other operations can, in some implementations, reduce power consumption of the system.

Additional aspects, features and various advantages will be readily apparent from the following detailed description, the accompanying drawings, and the claims.

BRIEF DESCRIPTION OF THE DRAWINGS

FIG. 4 is a flow chart illustrating an example of a data search operation using a DMA controller.

FIG. 5 is a flow chart illustrating an example of a pattern generation operation using a DMA controller.

DETAILED DESCRIPTION

Figure 1:
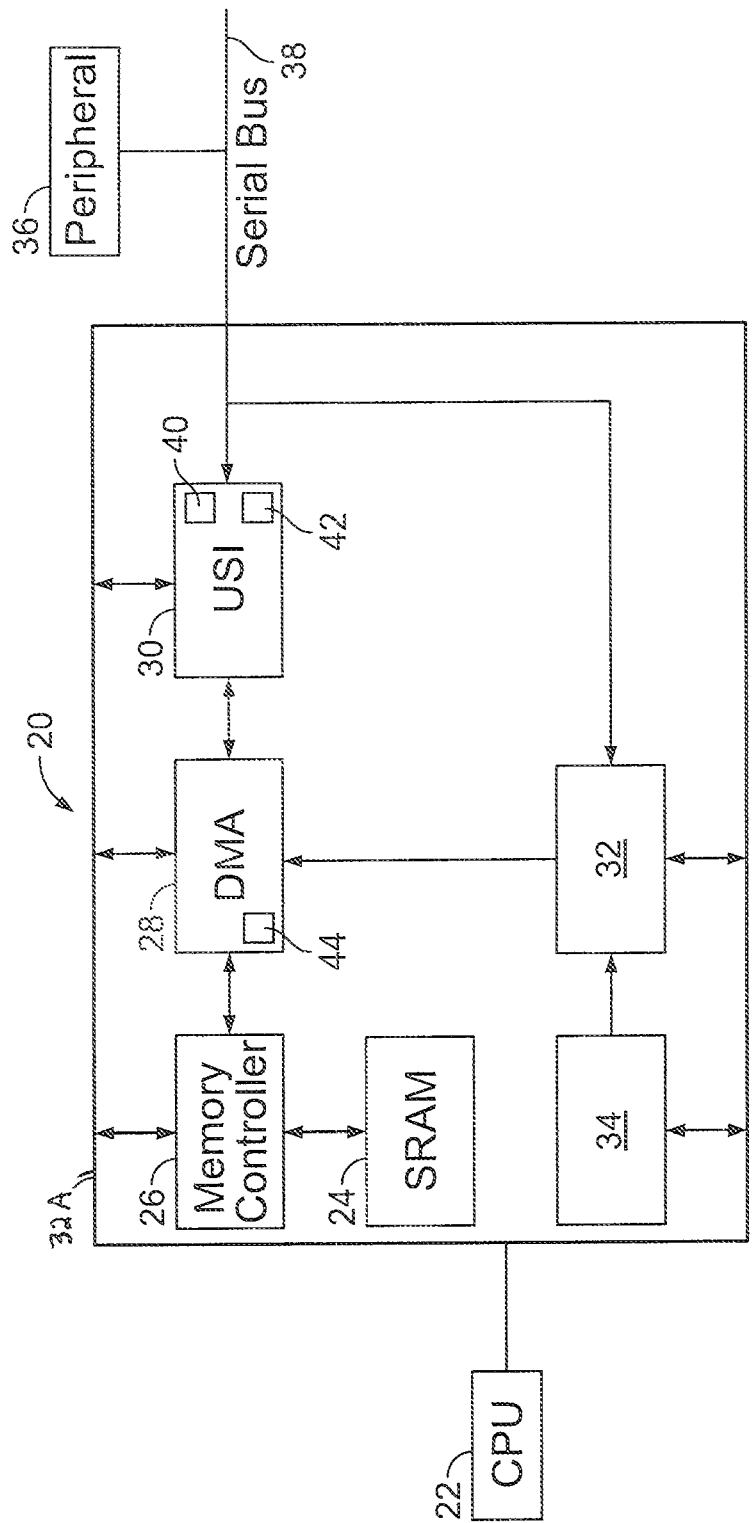
FIG. 1 is a block diagram of a microcontroller-based system including a DMA controller.

Examples of systems that can use DMA as described here include disk drive controllers, graphics cards, network cards and sound cards. DMA also can be used, for example, for intra-chip data transfer in multi-core processors. A particular example of an application in which DMA can be used is a battery management and protection system 20, a portion of which is illustrated in FIG. 1. System 20 includes a microcontroller (CPU) 22, non-volatile memory (e.g., SRAM) 24, a memory controller 26, a DMA controller 28 and a universal serial interface (USI) 30 such as a USART or SPI serial interface. In some implementations, these and other circuit components, such as an event system 32 and a timer 34, are integrated in a single integrated circuit. Various components including memory controller 26, DMA controller 28 and USI 30 can communicate with the CPU over bus 32A. In addition, one or more peripherals 36 can be connected to USI 30 by way of a serial bus 38. In the illustrated example, USI 30 includes external pins 40, 42 through which signals are sent to and received from serial bus 38.

Functions of CPU 22 include ensuring correct program execution, accessing memories, performing calculations and controlling peripherals. DMA controller 28 is operable to move data between memories and peripherals. In particular, DMA controller 28 can be used for fast, CPU-independent data transfer between any combination of data memory and peripherals. In particular, DMA controller 28 can move data between memories and peripherals, between memories and between peripheral registers directly. In some implementations, using DMA controller 28 can increase CPU performance due to less overhead than would be required by an interrupt-driven data transfer. This structure can help reduce the need for code and processor speed, which in turn can reduce power consumption.

In the illustrated implementation, DMA controller 28 has multiple (e.g., four) channels that can be configured independently of one another. Thus, for example, the channels can have individual source, destination, triggers and block sizes). The different channels also can have individual control settings and individual interrupt settings and interrupt vectors. To allow for continuous transfers, two channels can be inter-linked so that the second channel takes over the transfer when the first channel is finished and vice versa. Interrupt requests may be generated when a transaction is complete or when the DMA controller detects an error on a DMA channel. When a DMA channel requests a data transfer, a bus arbiter waits until CPU 22 is not using the data bus and permits DMA controller 28 to transfer data.

The DMA channels can be implemented in pairs where each pair is dedicated to a particular peripheral. The pair is divided into one channel to receive and one channel to transmit. Setting up and using DMA controller 28 can be accomplished through registers in the memory for each peripheral. DMA controller 28 is triggered by transmit and receive signals from the peripheral. When buffers reach their limits, DMA controller 28 can generate interrupts to the corresponding peripheral.

A complete DMA read and write operation between memories and/or peripherals can be referred to as a DMA transaction. A transaction is done in data blocks and the size of the transaction (number of bytes to transfer) is selectable from software and controlled by block size and repeat counter settings. Each block transfer can be divided into smaller bursts.

In some implementations, each DMA channel has a 16-bit address register and a 16-bit count register associated with it. To initiate a data transfer, the device driver sets up the DMA channel's address and count registers together with the direction of the data transfer, read or write. It then instructs the DMA hardware to begin the transfer. When the transfer is complete, the device interrupts CPU 22. In some implementations, DMA controller 28 does not send interrupt requests to CPU 22 itself. Instead, peripheral devices that utilize DMA controller 28 have dedicated bits in their status registers that are controlled by DMA controller 28. The peripherals can be configured to interrupt the CPU 22 when these status bits are asserted.

In the illustrated implementation, each DMA channel includes settings to one or more of the following modes of operation, which are described in greater detail below: data match mode, data search mode, and pattern generation mode. Subject to the limits of area required for the IC chip, there is no specific limitation as to how many bytes are used for DMA matching or pattern generation applications. However, in some implementations, the number of bytes is limited to two (i.e., 16 bits), which can be convenient for an 8-bit microcontroller. For the purpose of illustration, some of the examples discussed below assume the use of two bytes.

Data Matching for Serial Peripherals

In some settings, DMA controller 28 can be used to enable data transfer between peripherals only if a data match is first found. In this case, DMA controller 28 opens a link, for example, from the serial peripheral (e.g., USI 30) to memory (e.g., memory controller 26) only if DMA controller 28 detects an address match. This feature can be used, for example, in connection with protocols that include slave addresses or identifiers or in connection with messages broadcast to multiple peripherals. According to this aspect, a peripheral component connected to the bus accepts an incoming message only if the received identifier matches its internal identifier. If the identifier does not match, this node rejects the frame, and goes back to sleep or continues to listen to the bus. Performing such operations using DMA controller 28 can help avoid having the system run in active mode, which draws a relatively large amount of current.

Figure 2:
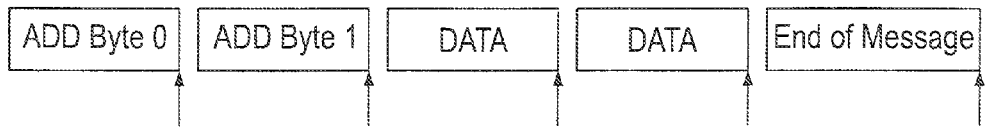
FIG. 2 illustrates an example of a message indicating when a serial interface requests a DMA action.

In data match configuration, DMA controller 28 can be configured as one channel or as two channels (e.g., one channel reserved to detect a data match and a second channel to enable data transfer, for example, between peripheral 36 (via USI 30) and SRAM 24 (via memory controller 26)). In some implementations, a channel configured in data match mode can be set to operate in any one of the following run different data match settings: (i) "match byte 1 AND byte 2," (ii) "match byte 1 OR byte 2," or (iii) "match one byte with mask." Thus, a DMA channel can be configured for a data match operation, including bytes with mask or AND/OR operations between multiple bytes In some implementations, a message from USI 30 is composed of several USI frames containing data, in which the first byte, and in some cases the first two bytes, refers to a node address or identifier. FIG. 2 illustrates an example of a message that includes two address bytes followed by two data bytes from USI 30. The arrows in FIG. 2 indicate triggers when USI 30 requests action to be taken by DMA controller 28.

If the DMA channel is set, for example, to detect "match byte 1 AND byte 2," then as the channel receives incoming data, the channel compares the first two bytes to a stored identifier (i.e., an address of the peripheral device or memory with which the channel is associated). If the comparison yields a match for the first two bytes, then the second DMA channel is enabled to transfer the subsequent bytes (e.g., eight bytes for a UART interface) to the addressed peripheral or memory (e.g., SRAM 24) without CPU intervention.

Each DMA channel contains a counter 44. For example, counter 44 in a DMA channel that is configured for detecting a data match defines a maximum number of read and compare operations the channel is able to perform without detecting a match. The channel can be configured, for example, such that the counter is enabled to stop operation if no match is found after the maximum number of read and compare operations. This feature can be useful to detect possible issues on the bus or to enable the system to go into deeper sleep modes. If the channel detects a match, then its counter 44 is rest. Likewise, counter 44 in a DMA channel that is configured for data transfer operations defines the number of transfers to be performed by the channel. The counter 44 in this case thus indicates the expected number of bytes to be transferred.

Figure 3:
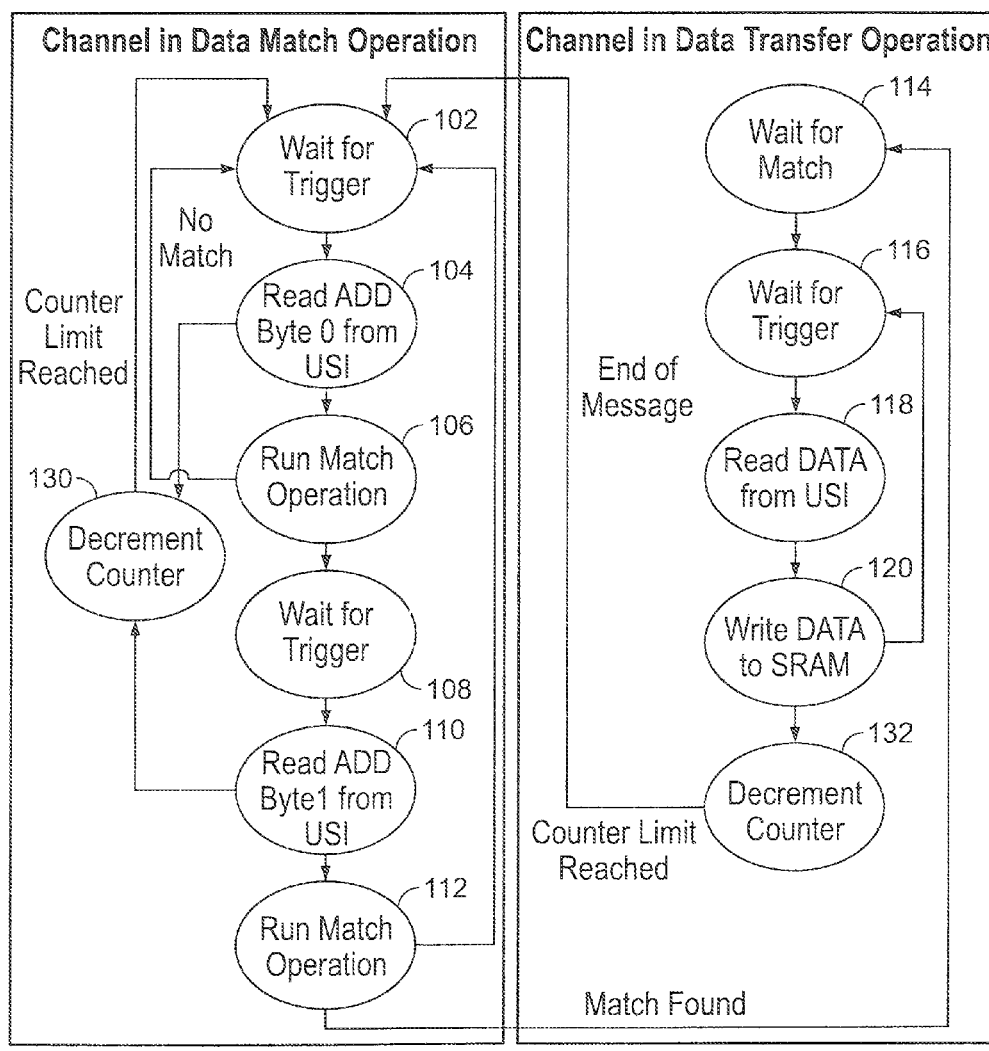
FIG. 3 is a flow chart illustrating an example of data match and data transfer operations using a DMA controller.

FIG. 3 illustrates an example of a pair of DMA channels, one of which is configured to perform data match operations (according to the "match byte 1 AND byte 2" setting) and the second of which is configured to perform data transfer operations. It is assumed for the purpose of illustration that both channels are associated with SRAM 24. As indicated by block 102, the DMA channel configured for data match operations waits to receive a trigger, for example, from USI 30. If the DMA channel receives a trigger, it proceeds to read a first address byte ("ADD Byte 0") from USI 30 (block 104). The DMA executes a match operation, which includes comparing the first address byte to a stored identifier (block 106). If the DMA channel does not detect a match the first address byte and the stored identifier, the process returns to block 102. On the other hand, if the DMA channel detects a match, then it proceeds to wait for a second trigger from USI 30 (block 108). If the DMA channel receives a second trigger from USI 30, it proceeds to read a second address byte ("ADD Byte 1") from USI 30 (block 110). The DMA then executes a match operation, which includes comparing the second address byte to another stored identifier (block 112). If the DMA channel does not detect a match the second address byte and the other stored identifier, the process returns to block 102. On the other hand, if the DMA channel detects a match, it enables the second DMA channel to transfer data and the process flow continues with the second DMA channel.

As illustrated on the right-hand side of FIG. 3, the second DMA channel that is configured to transfer data initially waits for an indication from the first DMA channel that a match has been detected (block 114). Once the second DMA channel receives such a signal, it is enabled for data transfer and awaits a trigger from USI 30 (block 116). When the second channel receives a trigger from USI 30, it reads a first byte of data from USI 30 (block 118) and writes the data to SRAM 24 via memory controller 26. The process then returns to block 116, and the second DMA channel waits for the next trigger from USI 30. In normal operation, this process continues until the second DMA channel has read the expected number of data bytes from USI 30 and has transferred the data bytes to SRAM 24.

During the foregoing process of FIG. 3, each time the second DMA channel writes data to SRAM 24, counter 44 in that channel is decremented by one so that the channel can be reset once the expected number of bytes are read and transferred (block 132). Likewise, each time the first DMA channel reads an address byte, counter 44 in that channel is decremented by one. If the channel is operating in accordance with the "match byte 1 AND byte 2" setting and a match is found for two sequential address bytes, then the counter in that channel is reset. On the other hand, if the counter reaches zero, this may indicate that there is a possible problem on the bus and, in response, the system may take appropriate action (e.g., an SRAM clock tree can be disabled so as to limit the power consumption inside the device).

As noted above, a DMA channel configured to operate in data match mode also can be set to operate in the "match byte 1 OR byte 2" setting or the "match one byte with mask" setting. The "match byte 1 OR byte 2" setting is similar to the "match byte 1 AND byte 2" setting, except that a second DMA channel can be enabled to transfer data if DMA channel configured in the "match byte 1 OR byte 2" setting identifies a match between a single data byte from USI 30 and a stored identifier. Thus, if the DMA channel identifies a match in at least one of the address bytes read from USI 30, the second DMA channel can be enabled for data transfer.

The "match one byte with mask" setting allows selective masking of bits in the address bytes such that when the DMA channel checks whether there is a match between the address bytes read from USI 30 and the stored identifier(s), the DMA channel ignores the value of specified bits in the data. This setting can be used, for example, to allow a message to be addressed to a range of addresses (e.g., to broadcast a message), rather than just a single address. For example, if the DMA channel is configured in the "match one byte with mask" setting with a mask for the second bit, then an address byte [0-001011] will be considered a match for both [01001011] and [00001011]. In the "match one byte with mask" setting, the channel can be configured to ignore any one or more specified bits in the byte.

The foregoing techniques can be used to facilitate a situation in which a peripheral component connected to a serial bus accepts an incoming message only if the received identifier in the message matches its internal identifier. If the identifier does not match, the peripheral device rejects the frame, and goes back to sleep or continues to listen to the bus. Performing such operations using DMA controller 28 can help avoid having the system run in active mode, which draws a relatively large amount of current.

Data Search in Non-Volatile Memory

DMA controller 28 also can be used in a data search mode to facilitate data reordering in non-volatile memory (e.g., SRAM) by searching for the start of a message, which may be, for example, a particular specified character. This allows for identification of the first SRAM address where a first message character is stored. The data search mode can be used, for example, with an SRAM buffer (e.g., to check the validity of data, such as a single-bit or multi-bit flag, stored in a reserved SRAM buffer) before DMA controller 28 transfers data, for example, from an SRAM buffer to a peripheral (e.g., peripheral 36).

A data search operation can be triggered, for example, by a DMA channel completing a data transfer from USI 30, an internal event (e.g., timer/counter or a pin change), or based on software instructions from CPU 22. The data search operation stops if a match is found or if the transfer counter reaches its limit. Interrupts can be generated to wake-up CPU 22 to take appropriate action. For example, if DMA controller 28 needs to transfer valid data from an SRAM buffer and no match is found during a data search operation, then DMA controller 28 can inform CPU 22 that no data is available. On the other hand, if a match is identified during a data search operation, DMA controller 28 can enable a second channel to transfer the data. An advantage of being able to configure a DMA channel in the data search mode is that CPU 22 need not read the information in the SRAM buffer.

For the purpose of illustration, it is assumed that a DMA channel is configured in the data search mode and that there are two bytes (i.e., sixteen bits) of information in the SRAM buffer that must be checked for validity. As shown in the example of FIG. 4, the DMA channel waits for a trigger, for example, from CPU 22 (block 202). If the DMA channel receives a trigger, it reads a first byte of data from a specified location in memory (e.g., SRAM 24) (block 204). Next, the DMA channel performs a match operation by comparing the information read from the memory to a first stored identifier (block 206). If there is no match, the process returns to block 202. On the other hand, if there is a match, the process proceeds to block 206A, and the DMA channel waits for another trigger from CPU 22. If the DMA channel receives another trigger, it reads a second byte of data from a specified location in memory (e.g., SRAM 24) (block 208), and performs a match operation by comparing the information read from the memory to a second stored identifier (block 210). If there is a match for the second byte of data read from SRAM 24, then the data in the SRAM buffer is assumed to be valid. Following block 210, the process returns to block 202, and the channel waits for another trigger signal. Thus, the data search operation stops automatically if a complete match is detected (i.e. two bytes in this example). In some implementations, a signal subsequently may be provided to enable another DMA channel for data transfer from SRAM 24. In some implementations, an interrupt signal may be provided to CPU 22 informing the CPU that the data in SRAM 24 is valid.

When the DMA channel is operating in the data search mode, the counter in the channel is decremented by one each time data is read from the SRAM buffer. If the results of block 210 fail to indicate that the data in the SRAM buffer is valid and the counter in the DMA channel reaches zero, then, in some implementations, the second DMA channel used for data transfer is disabled.

Pattern Generation

A DMA channel also can be configured to operate in the pattern generation mode. For example, DMA controller 28 can be used to facilitate power optimization by using embedded pattern generators to be written or sent to an external location. For example, the pattern can be written into non-volatile memory (e.g., SRAM 24) or can be sent automatically over USI 30. In some implementations, the pattern is two bytes in length; in other implementations, the length of the pattern may be different.

FIG. 5 illustrates an example of two-byte pattern generation operation, where a unique pattern is generated by the DMA channel and written to SRAM 24. In the following description, it is assumed that the DMA channel is configured in pattern generation mode. Initially, the channel waits for a trigger, for example, from CPU 22 (block 302). If the DMA channel receives a trigger signal, it writes a first byte of the predetermined unique pattern to SRAM 24 (block 304) and then writes a second byte of the pattern to SRAM 24 (block 306). The counter in the DMA channel is decremented each time the channel writes a byte of the pattern to SRAM 24 based on the number of bytes in the pattern (block 310). Once the counter reaches zero, the process returns to block 302 and the DMA channel waits for the next trigger. In some implementations, when the count reaches zero, DMA controller 28 generates an interrupt signal that is transmitted to CPU 22. The pattern generation mode can be used, for example, to initialize or re-initialize a buffer of data, such data in an SRAM buffer. CPU 22 can remain is an idle state while DMA controller 28 performs the pattern generation operation. Furthermore, it is not necessary in the illustrated example for the DMA channel to perform any read operations to or from SRAM 24 as part of the pattern generation operation, thereby further limiting power consumption.

A DMA channel also can be configured to operate in pattern generation mode so as to write, for example, a specified pattern to a serial interface such as USI 30. This example is similar to the process of FIG. 5, except that the DMA channel writes the pattern to a shift register in UST 30, rather than writing the pattern to SRAM 24. An example of a pattern that the DMA channel writes to USI 30 is a unique wake-up character (e.g., "0x80") used in some protocols to bring a peripheral device out of a low-power or sleep mode. DMA controller 28 can generate and transmit the pattern (e.g., the wake-up character) without involvement of CPU 22. This capability can, in some implementations, reduce power consumption of the system. In some implementations, the DMA channel can generate a unique pattern to serve, for example, as a broadcast message identifier or a slave address (or identifier). As noted above, CPU 22 can remain is an idle state while DMA controller 28 performs the pattern generation operation. Furthermore, it is not necessary for the DMA channel to perform any read operations to or from serial interface 30 or peripheral 36 as part of the pattern generation operation, thereby further limiting power consumption.

Multiple DMA channels can be linked so that the various modes of operation (e.g., pattern generation, data matching and/or data transfer modes) enable various features to work in synergy. For example, multiple DMA channels can be linked in an application for a serial bus with one master node and one slave node. As part of the overall operation, the initial state of a bus may be in a sleep mode. The master node may send to the slave node a request that includes a wake-up character (e.g., "0x80"). The slave node answers this request by sending its identifier to the master node, along with one or more bytes of data. When the bus identification is completed, the bus status is active, and normal communication can take place. In this way, the master node is informed which slave nodes are awake or present on the bus. Providing for automatic response by the slave nodes without involving CPU 22 can reduce power consumption and optimize the code in SRAM 24.

Figure 6:
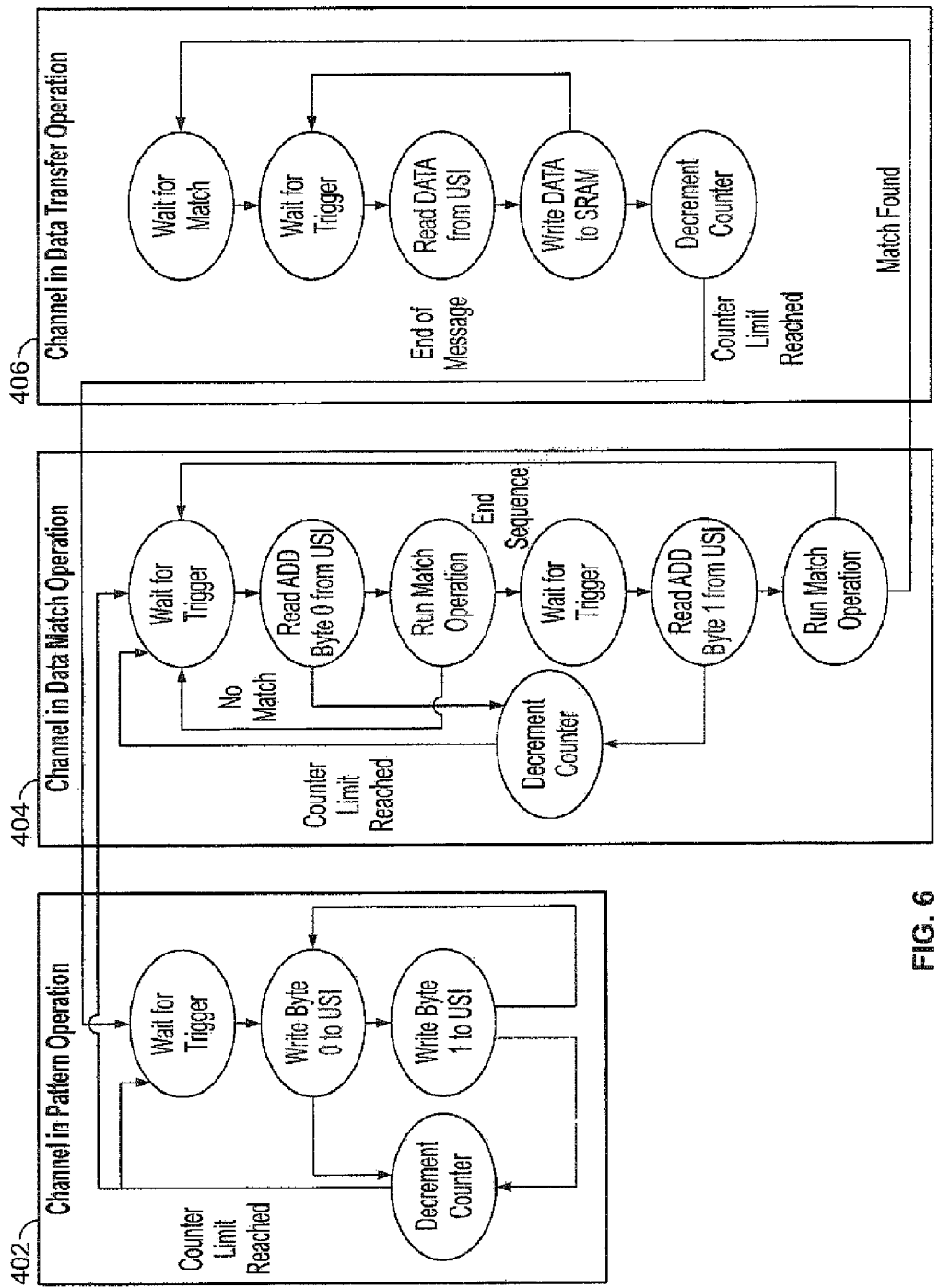
FIG. 6 is a flow chart illustrating an example of multiple linked DMA channels performing pattern generation, data match and data transfer operations.

FIG. 6 illustrates an example of several linked DMA channels, a first one of which is configured in the pattern generation mode, a second one of which is configured in the data match mode, and a third one of which is configured in the data transfer mode. In this example, CPU 22 can remain in an idle state while the first channel in DMA controller 28 is used to write a specific two-byte pattern (e.g., wake-up character "0x80") to USI 30 (block 402). DMA controller 28 then enables the second DMA channel, which waits for a response from the slave node (e.g., USI 30). Assuming that the slave node correctly decodes the pattern (e.g., the wake-up character) and returns its address or identifier, then when DMA controller 28 receives the response, the second DMA channel checks whether the initial bytes match a stored address or identifier associated with the slave node (block 404). If a match is found, DMA controller 28 enables the third channel to receive the data in subsequent bytes and to transfer the data to the intended target destination (e.g., SRAM 24) (block 406).

The foregoing examples illustrate that DMA controller 28 can be configured to enable a channel in data transfer mode automatically after a data match operation or a pattern generation operation and that DMA controller 28 can be configured to enable a channel in data match mode after a pattern generation operation and to enable another channel in data transfer mode after a data match operation.

The DMA channels are user configurable, and the settings for each channel can be made using one or more registers associated, respectively, with each DMA channel. Although the number of channels depends at least in part on the particular implementation, four channels can be used, for example, with an eight-bit CPU.

Some implementations provide one or more of the following advantages. For example, lower power consumption, and thus longer battery life-time, may result by reducing use of CPU 22. In some cases, certain operations may take place more quickly because a CPU access often requires more cycle than a DMA access. Some implementations provide greater code optimization because the software application knows that when an interrupt is received, the message if for the corresponding device. There also may be less latency on the buses, and thus higher bandwidth.

Other implementations are within the scope of the claims.

What is claimed is:

1. A system comprising:
a central processing unit (CPU);
a peripheral device;
non-volatile memory; and
a direct memory access (DMA) controller including DMA channels, wherein a first one of the channels is reserved for data matching, the first channel being operable to determine whether there is a match between information from the peripheral device and information stored by the DMA controller,
wherein a second one of the channels is linked to the first channel, and wherein the second channel is enabled to transfer data from the peripheral device to the non-volatile memory only if the first channel determines there is a match between the information from the peripheral device and the information stored by the DMA controller.

2. The system of claim 1 wherein the peripheral device is coupled to the DMA controller by a serial interface, wherein the first channel is operable to determine whether information from the serial interface matches specified identification information stored by the DMA controller and associated with the peripheral device, and wherein the DMA controller is operable to transfer the data from the peripheral device to the non-volatile memory via the second channel only if the first channel determines that there is a match between the information from the serial interface and the identification information.

3. The system of claim 1 wherein, in response to receiving a trigger signal, the first channel reads a first portion of information from the serial interface and compares the first portion of information to the identification information.

4. The system of claim 3 wherein, if the first channel determines there is match between the first portion of information and the identification information, the first channel reads a second portion of information from the serial interface and compares the second portion of information to the identification information.

5. The system of claim 1 wherein the first channel is configurable to determine whether there is a match between first and second bytes of information from the peripheral device and the identification information stored by the DMA controller, and wherein the DMA controller is operable to enable the data transfer from the peripheral device to the non-volatile memory via the second channel to occur only if it is determined that there is a match for both bytes of information.

6. The system of claim 1 wherein the first channel is configurable to determine whether there is a match between at least one of first or second bytes of information from the peripheral device and the identification information stored by the DMA controller, and wherein the DMA controller is operable to enable the data transfer from the peripheral device to the non-volatile memory via the second channel to occur if it is determined that there is a match for at least one of the bytes of information.

7. The system of claim 1 wherein the first channel is configurable to determine whether there is a match between the identification information stored by the DMA controller and selected bits of information from the peripheral device and, and wherein the DMA controller is operable to enable the data transfer from the peripheral device to the non-volatile memory via the second channel to occur if it is determined that there is a match for the selected bits of information.

8. The system of claim 7 wherein the first channel is operable to ignore specified bits of information from the peripheral device when it determines whether there is a match.

9. The system of claim 1 wherein the non-volatile memory comprises Static Random Access Memory (SRAM).

10. A system comprising:
non-volatile memory; and
a direct memory access (DMA) controller including DMA channels, wherein a first one of the channels is operable to read information from the non-volatile memory and to determine whether there is a match between the information from the non-volatile memory and information stored by the DMA controller, wherein if the first channel determines that there is a match between the information from the non-volatile memory and information stored by the DMA controller, the DMA controller enables a second one of the channels to transfer data from the non-volatile memory to a serial interface for delivery to a peripheral device.

11. The system of claim 10 further comprising a central processing unit (CPU), wherein the CPU provides one or more trigger signals that cause the first channel to read the information from the non-volatile memory and to determine whether there is a match between the information from the non-volatile memory and information stored by the DMA controller.

12. The system of claim 11 wherein if the first channel determines that there is a match between the information from the non-volatile memory and information stored by the DMA controller, the DMA controller informs the CPU that data from the non-volatile memory is valid.

13. The system of claim 10 wherein the first channel is operable, in response to a first trigger signal, to read a first byte of information from the non-volatile memory and to determine whether there is a match between the first byte of information and first identifier information stored by the DMA controller, and, in response to a second trigger signal, to read a second byte of information from the non-volatile memory and to determine whether there is a match between the second byte of information and second identifier information stored by the DMA controller.

14. The system of claim 10 wherein the first channel is operable automatically to complete a data search operation of the non-volatile memory if the first channel determines that a match exists between a predetermined number of bytes of information read from the non-volatile memory and information previously stored by the DMA controller.

15. The system of claim 10 wherein operations performed by the first channel provide for identification of a first address in the non-volatile memory where an initial message character is stored.

16. The system of claim 10 wherein the non-volatile memory comprises SRAM.

17. A system comprising:
a serial interface;
a peripheral device coupled to the serial interface;
non-volatile memory; and
a direct memory access (DMA) controller including a plurality of linked channels including a first channel configured to operate in a first pattern mode, a second channel configured to operate in a second mode, and a third channel configured to operate in a third mode,
wherein the first channel is operable to write a wake-up character to the serial interface for transmission to the peripheral device,
wherein the second channel is operable to determine whether there is a match between information from the peripheral device and information stored by the DMA controller, and if there is such a match, to enable the third channel to transfer data from the peripheral device to the non-volatile memory.

18. The system of claim 17 further comprising a central processing unit (CPU), wherein, following receipt of the trigger signal, the first channel writes the wake-up character to the serial interface without intervention by the CPU.

19. The system of claim 18 wherein, the second channel is operable to read information from the serial interface that was obtained from the peripheral device and to determine whether there is a match between the information from the peripheral device and information stored by the DMA controller without intervention by the CPU.

20. The system of claim 19 wherein, if enabled to transfer data by the second channel, the third channel reads data from the serial interface that was obtained from the peripheral device and transfers that data to the non-volatile memory without intervention by the CPU.

21. The system of claim 10 wherein operations performed by the first channel provide for a check of the validity of data stored in a reserved buffer of the non-volatile memory.

* * * * *